(12) United States Patent
Kirkby

(10) Patent No.: US 8,882,388 B2
(45) Date of Patent: Nov. 11, 2014

(54) UNDERWATER OIL AND GAS COLLECTION SYSTEM

(76) Inventor: Alan Dennis Kirkby, London (GB)

( * ) Notice: Subject to any disclaimer, the term of this patent is extended or adjusted under 35 U.S.C. 154(b) by 67 days.

(21) Appl. No.: 13/808,236

(22) PCT Filed: Jul. 7, 2011

(86) PCT No.: PCT/GB2011/051273
§ 371 (c)(1),
(2), (4) Date: Jan. 3, 2013

(87) PCT Pub. No.: WO2012/004601
PCT Pub. Date: Jan. 12, 2012

(65) Prior Publication Data
US 2013/0115002 A1      May 9, 2013

(30) Foreign Application Priority Data

Jul. 7, 2010   (GB) .................................. 1011445.2

(51) Int. Cl.
| | |
|---|---|
| *E02B 15/04* | (2006.01) |
| *B63C 7/00* | (2006.01) |
| *E02B 15/08* | (2006.01) |
| *E21B 43/01* | (2006.01) |

(52) U.S. Cl.
CPC ............... *E02B 15/045* (2013.01); *B63C 7/006* (2013.01); *E02B 15/08* (2013.01); *E21B 43/0122* (2013.01)
USPC ................... 405/68; 405/60; 405/64; 405/210

(58) Field of Classification Search
CPC ............................... F17C 1/007; B65D 88/78
USPC ............... 405/52, 60, 63, 64, 66, 68, 69, 210; 166/363, 364; 210/923, 170.05, 210/170.11, 747.5, 747.6, 242.3
See application file for complete search history.

(56) References Cited

U.S. PATENT DOCUMENTS

| | | | |
|---|---|---|---|
| 3,001,313 A | * | 9/1961 | Long .................................. 43/4 |
| 3,653,215 A | | 4/1972 | Crucet |

(Continued)

FOREIGN PATENT DOCUMENTS

| | | |
|---|---|---|
| CA | 2180408 A1 | 1/1998 |
| EP | 1459976 A1 | 9/2004 |

(Continued)

*Primary Examiner* — Sean Andrish
(74) *Attorney, Agent, or Firm* — David A. Guerra

(57) ABSTRACT

A device for collection of oil and gas from an underwater source comprising a balloon-like structure (1) defined by an envelope having an opening (18), which, in operation, is on the underside of the balloon-like structure, which balloon-like structure includes: a vent (23) adapted to vent gas in the envelope, and control means (2) for controlling the oil upper level having a closure valve (3) adapted to control flow of gas in the envelope through the vent, the valve being closable by a valve closure member operable by a float (8) adapted to float on the oil to determine the minimum volume of gas in the envelope, wherein, in use, the balloon-like structure is adapted to be placed over the source to collect oil and gasses from said underwater source. The balloon-like structure further includes buoyancy means (10, 12, 14, 16, 17) adapted to control the buoyancy of the structure to enable ascent to the surface of the water in a controlled manner. The envelope may be formed of a flexible material to enable it to be collapsed or folded for storage and/or transportation.

20 Claims, 3 Drawing Sheets

(56) References Cited

U.S. PATENT DOCUMENTS

| | | | |
|---|---|---|---|
| 3,981,154 A | 9/1976 | Kix, Jr. | |
| 4,146,482 A * | 3/1979 | Shyu | 210/242.3 |
| 4,531,860 A * | 7/1985 | Barnett | 405/60 |
| 4,790,936 A | 12/1988 | Renfrow | |
| 2005/0025574 A1 * | 2/2005 | Lazes | 405/60 |
| 2008/0135257 A1 | 6/2008 | Zhang | |

FOREIGN PATENT DOCUMENTS

| | | |
|---|---|---|
| FR | 2852917 A1 | 10/2004 |
| WO | 8201387 A1 | 4/1982 |
| WO | 0058564 A1 | 10/2000 |

\* cited by examiner

UNDERWATER OIL AND GAS COLLECTION SYSTEM

CROSS-REFERENCE TO RELATED APPLICATIONS

This application is an U.S. national phase application under 35 U.S.C. §371 based upon co-pending International Application No. PCT/GB2011/051273 filed on Jul. 7, 2011. Additionally, this U.S. national phase application claims the benefit of priority of co-pending International Application No. PCT/GB2011/051273 filed on Jul. 7, 2011 and Great Britain Application No. 1011445.2 filed on Jul. 7, 2010. The entire disclosures of the prior applications are incorporated herein by reference. The international application was published on Jan. 12, 2012 under Publication No. WO 2012/004601 A2.

BACKGROUND OF THE INVENTION

1. Field of the Invention

The present invention relates to a device and method for collection of oil and gas from an underwater source, and particularly but not exclusively, to the collection and recovery of oil from undersea leakages.

2. Description of the Prior Art

Modern engines and turbines are often powered by oil, diesel or other oil derivatives. Further, oil derivatives are also used as lubricants and to generate heat. Thus, oil extraction is significantly important to our way of living. Oil is a hydrocarbon found in pockets in the Earth's crust which is commonly referred to as crude oil. Obtaining oil is difficult as it involves finding these pockets which also contain gases and extracting the oil therein without causing the oil to simply pour out as a result of pressure differentials. As oil comprises complex hydrocarbons which take thousands of years to develop by a chemical and mechanical process, the existing reservoirs are effectively the only supply of oil readily available. Thus, oil is a significantly valued commodity.

Oil-containing reservoirs can be located under dry land or underwater. Submarine oil extraction is particularly difficult because the entire process is further constrained by the environment. Moreover, leaks resulting from the extraction process are very harmful to marine ecosystems because oil chemicals are toxic to marine organisms and birds; further, as oil has a high viscosity, marine animals and birds become coated in oil if they happen to be on a leak site. Currently, there are no methods which are guaranteed to contain or clear an underwater oil leak. Further, current methods focus on containing or mitigating environmental damage but are not suitable to prevent wastage of the leaked substance, i.e. collect and recover oil and gas, and, in addition, contain or mitigate environmental damage.

For example, a sub-sea oil recovery system is known which comprises a rigid cap structure which, in use, is placed over a leak to collect hydrocarbons from a leaking well. The structure comprises lines connected to a pump which pumps the leaking oil into a vessel on the water surface. The collected substances can then be separated by additional methods. Although, this method is effective in shallow leak sources it is not suitable from a practical point of view for use in deep waters.

SUMMARY OF THE INVENTION

The present invention therefore seeks to provide an underwater oil and gas collection and recovery system to both prevent damage to marine environments and decrease the quantity of oil wasted during leaks which is effective in both shallow and deep waters.

According to the present invention there is provided a device for collection of oil and gas from an underwater source comprising a balloon-like structure defined by an envelope having an opening, which, in operation, is on the underside of the balloon-like structure, which balloon-like structure includes:

a vent adapted to vent gas from the envelope, and control means for controlling the oil upper level, which control means has a closure valve adapted to control flow of gas from the envelope through the vent, the valve being closable by a valve closure means, which valve closure means is adapted to determine the minimum volume of gas retained in the envelope and operable by floating means adapted to float on the oil, wherein, in use, the balloon-like structure is adapted to be placed over the source to collect oil and gasses from said underwater source and further includes buoyancy means adapted to control the buoyancy of the structure to enable ascent to the surface of the water in a controlled manner.

The envelope is preferably formed of a flexible material to enable the envelope to be collapsed or folded for storage and/or transportation. More preferably, the envelope is formed of a pressure resilient material to prevent collapse of the envelope when submerged.

Preferably, the buoyancy control means is adapted to allow inflow of gas to increase or decrease buoyancy of the balloon structure.

In a preferred embodiment, the device further comprises guide lines adapted to secure the balloon structure to rails, anchors or weights.

In another preferred embodiment, the opening comprises at least one rigid ballast ring adapted to keep said opening open and prevent it from collapsing. The ballast ring may comprise a tube adapted to be filled with compressed gas by which it is maintained in a substantially rigid configuration.

Preferably, the control means for controlling the gas volume is adapted to receive gas from the source, an independent reservoir or a combination thereof.

In another preferred embodiment, the balloon-like structure further comprises means for determining whether a predetermined volume of oil has been reached by monitoring the buoyancy of the balloon-like structure. Further, the device may comprise means for sensing proximity of the seabed or sea surface.

Preferably, the device further comprises one or more placement control units adapted to control the release and supply of gas to allow resurfacing and/or placement of the balloon structure in a controlled manner.

In a preferred embodiment, the device comprises one or more filters or screens to filter out debris.

In another preferred embodiment, the device includes a pipeline connected to the envelope to remove oil therefrom.

In yet another embodiment, the device includes oil sensor means to determine when an envelope full condition for the oil is reached.

Preferably, there is provided a submersible vessel adapted to incorporate a plurality of said devices, the vessel being adapted to submerge and be positioned over said source, which submersible vessel is manoeuvrable to enable the plurality of devices to be successively positioned over said source and filled with oil, the vessel being adapted to return to the surface to enable the oil to be removed.

According to a second aspect of the present invention there is provided a method for collecting oil and gas from an underwater source comprising the steps of:
  providing a balloon-like structure defined by an envelope having a bottom opening,
  placing and securing the balloon-like structure over the underwater source so that the opening is substantially over the source,
  allowing oil and gas from the source to enter the balloon-like structure,
  allowing the oil and gas to be separated by density gradient, venting any excess gas,
  allowing floating means to rise up in conjunction with oil level so that, when oil reaches a predetermined level, the floating means close a valve to control gas volume,
  extracting the oil within the balloon-like structure by either connecting at least one line from the balloon-like structure to a vessel or by allowing the balloon-like structure to resurface in a controlled manner.

The present invention provides advantages over known methods because it collects and recovers oil and gases pouring out of the leak, in a more efficient and cost-effective manner thus preventing irreparable or additional damage to marine environments and also wastage of the leaked substances.

BRIEF DESCRIPTION OF THE DRAWINGS

An exemplary embodiment of the present invention will now be described in detail with reference to the following figures.

DETAILED DESCRIPTION OF THE INVENTION

Figure 1:
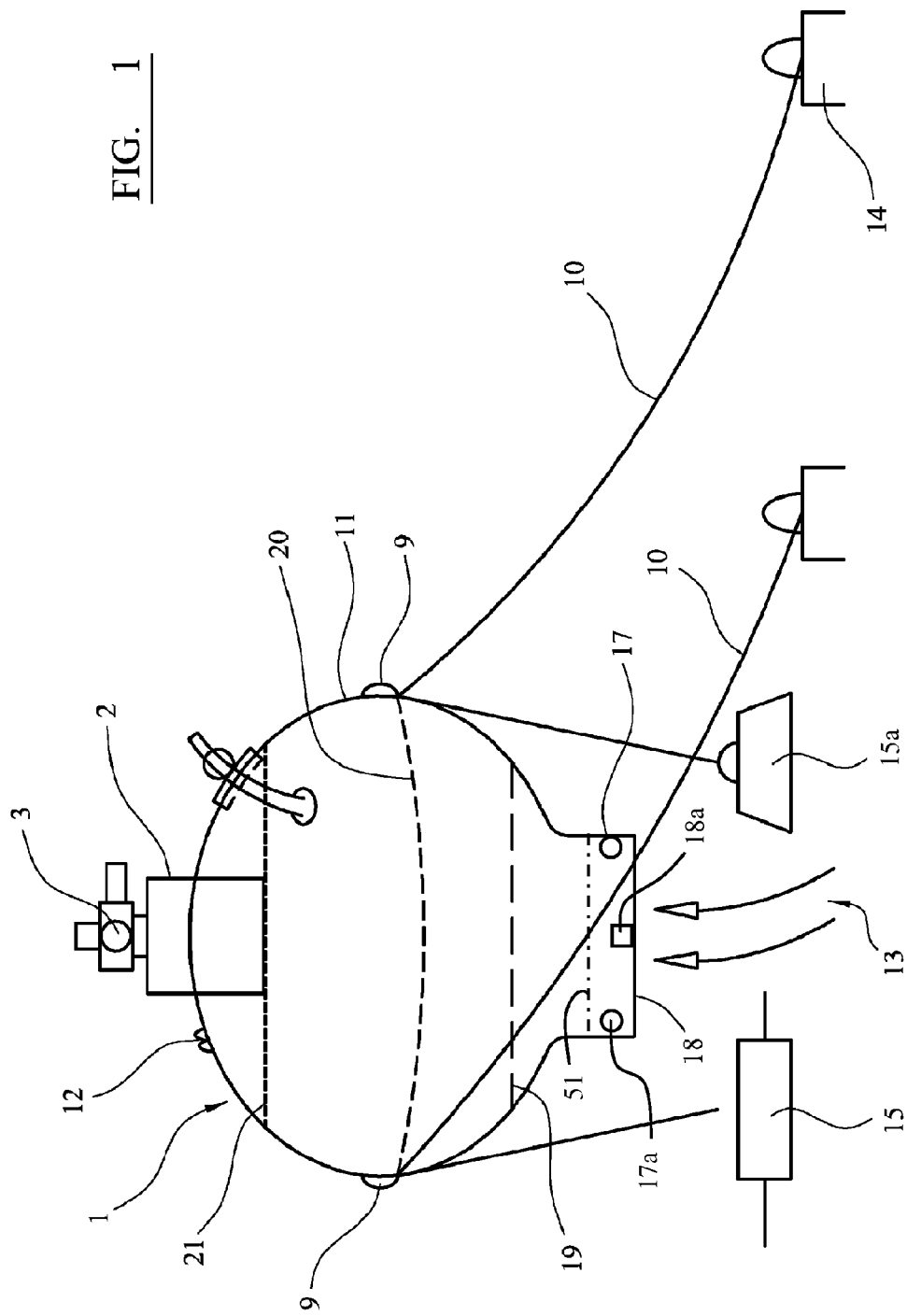
FIG. 1 is a schematic view of the system of the present invention.

Referring to FIG. 1, the system comprises a generally spherical balloon structure formed by an envelope having an opening 18 at the bottom thereof. The balloon structure 1 has control means 2, which means 2 comprises a vent 23 for venting surplus gasses by using its controller float. The balloon structure 1 further comprises one or more rings 17 adapted to prevent inadvertent closing of the balloon opening 18. The one or more rings 17 can include a tube 17a configured to be filled with compressed gas so as to maintain the ring in a substantially rigid configuration. The balloon structure 1 is provided with one or more placement control units 9 on the outer surface of the balloon structure 1 to control fine movement and placement of the balloon, which placement control units 9 typically contain gas. The balloon structure 1 is further provided with guide lines 10 secured to the outer surface thereof 11 and hoisting means 12 adapted to enable users to sink and pull the balloon structure 1. In use, the balloon structure 1 is adapted to be placed over the leak 13 and secured to storage or anchor means 14 by guide lines 10. Alternatively, guide lines 10 are connected to anchored rails 15 on the seabed and to weights 15a. Once the opening 18 of the balloon structure 1 is securely placed over the source, oil and gasses pour into the structure 1 though the opening 18 which is held in its semi-rigid open configuration by the stabilising ballast ring or rings 17. Guide lines 10 connected to the storage or anchor means 14, rails 15, and weights 15a allow the balloon structure 1 to be manoeuvred in a controlled manner prior to resurfacing in a controlled manner or to be parked aside on the seabed at neutral buoyancy. If the balloon structure 1 is to be raised toward the water surface, the guide lines 10, are simply disconnected from the storage or anchor means 14, rails 15, and weights 15a thereby allowing the structure to resurface. Hoisting means are used in one embodiment to pull and guide the balloon structure towards the water surface and return to the source once it has been emptied. The balloon structure 1 is kept level by the ballast or ring 17 weight which allows stable ascent or descent of the balloon structure 1 when buoyancy is varied, by oil on ascent and gas in descent.

Figure 2:
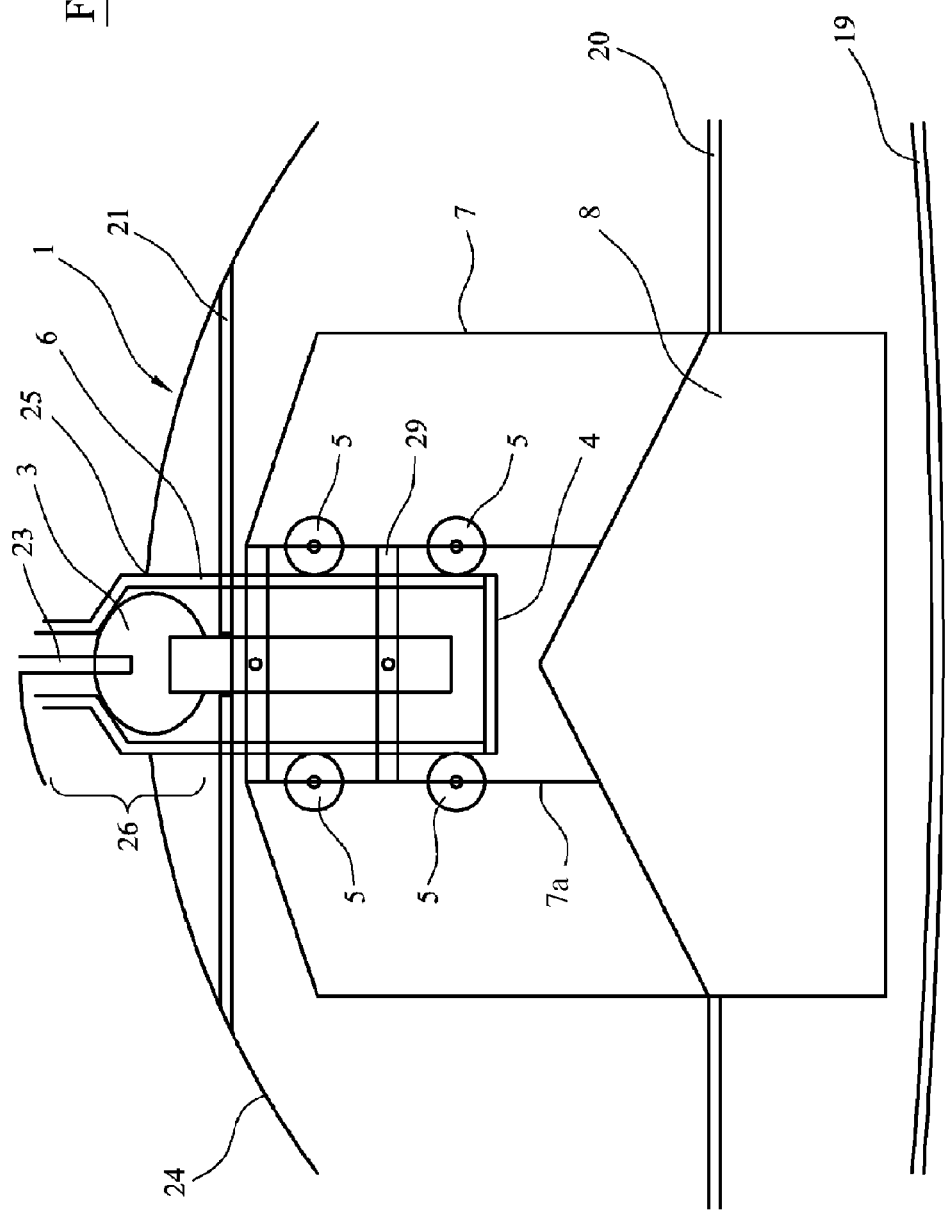
FIG. 2 is a detailed view of the internal setup of the balloon structure.

Referring now to FIG. 2, as oil and gas enter the balloon structure 1, the fluid substances within the structure 1 are separated by density; spaced screens or filters 19, 20, 21 serving to filter out solids. The first screen 19 is the coarsest while the third screen 21 is the finest of the three precautionary filters. In use, gases are vented from an uppermost volume defined by the oil surface, the highest position of which oil surface is determined by the float 8 and the valve control means. The vent 23 is closable by a valve 3, the valve 3 being located, in the installed position, at the upper end of a generally cylindrical hollow guide post 4 having a first frame 6 along which a plurality of spaced rollers 5, carried by a second frame 7 are engageable, which second frame 7 includes a support 7a carrying the rollers 5 and a float 8 adapted to float on captured oil and control buoyancy of the balloon structure 1. The float is adapted to contact a valve closure element as it rises on the captured oil to close the valve when the required volume of gas for the required buoyancy is present. Crude oil flows to form a layer on which the float 8 floats; the gas volume and the third screen 21 protect the valve control means and the valve itself. Water is kept isolated below the oil layer as a result of the density gradient. When the balloon-like structure has reached a predetermined gas capacity indicative of neutral or preferred buoyancy, the valve 3 within the oil level control means 2 is closed by the float 8; thus, gas volume is controlled to get the required buoyancy and oil level. Further, the valve 3 comprises means for controlling outflow and inflow (independent, leak-related or a combination thereof) of gas within the control means 2 so that, ascent and descent of the balloon structure to and from the surface and loading can be controlled.

The balloon structure 1 is formed by an enclosing envelope 24 having a channel 25 substantially centred on its apex; said channel 25 defines the vent 23. The channel comprises a top portion 26, which top portion comprises the vent 23 and valve 3. The gas volume defines a first cross section within the balloon structure 1, which first cross section includes most of the valve components. The valve 3 is enclosed in the first frame 6 which frame defines the guide post 4. The frame 6 comprises at least one substantially horizontal member 29 adapted to interact with floating means 8 which raise together with the volume of oil within the balloon structure 1 so that when the oil within the balloon structure has reached a predetermined level, the valve 3 within the control means 2 is closed by the float 8; thus, gas volume is controlled to achieve the required oil level. In addition, the floating means 8 may be sloped, self-cleaning or both. Oil continues to enter the envelope until it reaches a position close to the opening at which an envelope full signal is generated by oil presence sensors 18a located just above the opening 18. Oil level and buoyancy are controlled by the volume of accumulated gas and the oil within the structure 1 to prevent expulsion therefrom. Further, sensors could also be used. The floating means 8 interact with the guide post 4 to enable closure of the vent valve 3. The outer surfaces of the guide post 4, comprise a plurality of rollers 5 adapted to accurately guide the float 8 using ropes, belts or other central guiding means. The guide post is enclosed in a second frame 7, which frame is larger than first frame 6, so that the space between the first frame 6 and the second frame 7 can be at least partially filled with and allow movement of the float 8. In the present embodiment, the second frame 7 is located between the first and third screens 19, 21, thus the second screen 20 is discontinuous to protect the rollers 5; however, the second frame 7 could be limited to the space between the first and second screens 19, 20 or even the space between the second and third screens 20, 21 provided the first frame 6 was extended to include seabed sensing by the valve.

Figure 3:
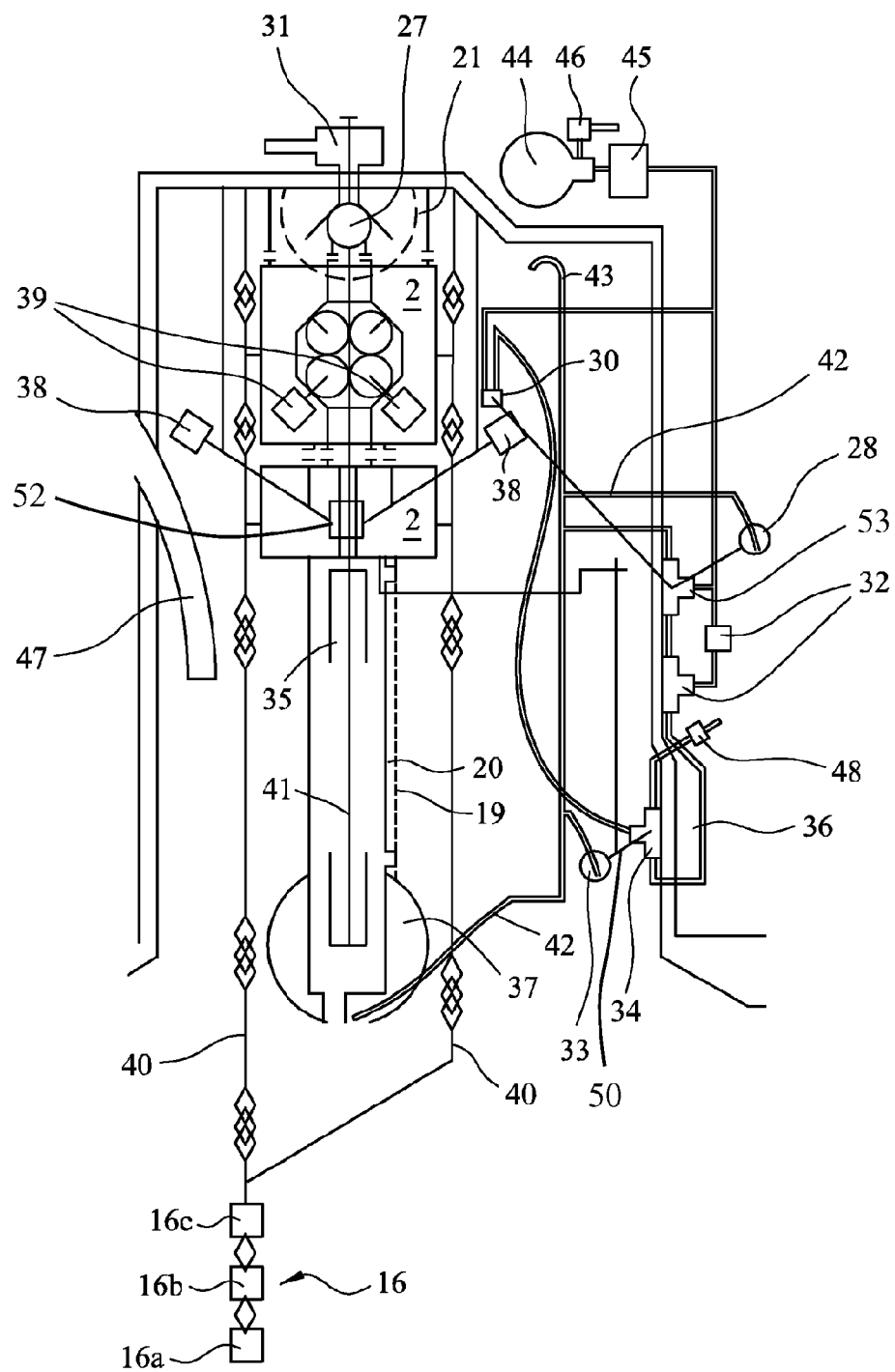
FIG. 3 shows a preferred embodiment of the present invention.

Referring now to FIG. 3, in one embodiment, the control means 2 comprise a plurality of valves within the generally cylindrical guide post 4. In the example shown, the control means 2 comprise two valves; the first valve is an exhaust valve 27 and the second valve is a loading valve 30. In use, the balloon structure is initially moored at the sea surface while the structure is maintained afloat by inert gas; the envelope 24 does not contain oil and the exhaust valve 27 is in its closed position. Loading valve 30 is open when the buoyancy control element is on the sea surface. The gas content is maintained by the buoyancy control element 28 operating a further valve 53. The inert gas is obtained from a high-pressure reservoir 44 at a reduced pressure. Once the surface operators have checked the status of the balloon structure and verified that the structure is secure, i.e. when surface personnel confirms that the vessels is safe to send down to the seabed for manoeuvring and filling, the valve 53 is switched to the sink position This operation switches control of gas supply to the buoyancy control valve 34, which buoyancy control valve 34 has an adjuster 36 to maintain required buoyancy in prevailing water salinity and temperature.

The buoyancy control valve 34 removes gas from the vessel so that it can descend in a controlled fashion and at a controlled rate. Although the envelope has neutral buoyancy, weights 15a are attached to the vessel, thus, when the buoyancy control element 28 is switched to the sink position, the buoyancy control valve 34 controls the rate of descent. As the vessel sinks deeper, the environmental pressure increases and gas is added to maintain a constant volume.

When the vessel approaches the seabed, a weight 16, preferably the lowest of a multi-weight pendulum weight element 16a contacts the seabed and the rate of descent is decreased. As the descent is slowed, the remaining sequence of pendulum weight element 16b, 16c contacts the seabed or a lower pendulum weight-element 16a at decreasing speed. As the pendulum weight elements 16a, 16b, 16c touch the seabed, the control means 2 receives a signal, which signal indicates that the vessel is touching the seabed and has stopped or will soon stop descending. When the final pendulum weight element 16c hits the seabed, the gas venting control mechanism is activated; the internal float valve 34 is isolated by valve 30 closing and manual controls 32, and thus, rendered inoperative at the seabed. The vessel is held in neutral buoyancy state by manual controls 32, which manual controls 32 are adapted to allow positioning over the leak source or, in parking mode, over the seabed. Further, float 37 maintains pendulum lines 40 connected to weights 16 tensed above seabed and preserves an operative connection to mechanism 2. Weights 38 and 39 are adapted to control tension of chains or cables 40. Weight element 52 provides additional load for gas venting with its water content during ascent gas release. Pipe line 42 is installed to maintain ambient pressure within each float element and allow self-draining to occur. The vent 43 is adapted to allow gas ingress and egress to and from envelope. This vent 43 is installed in the uppermost part of the envelope so as to be in the gas environment to prevent oil or water from interfering with the valve's functioning. The high pressure reservoir 44, a pressure reducer, 45 and a gas supply connector 46 control gas provision to the interior of the envelope. Pipe 47 is adapted to allow unloading of the oil as described below. Vent 48 allows gas to be released when the vessel is initially submerged. Internal water level whilst empty of oil at sea surface is indicated by line 51. Lever and latch 50 are provided as precautionary measure during seabed manoeuvres.

Filling operation commences once the vessel is over the leak source as described above. Typically, an oil leak will comprise gases and oil. Gases are released at various different pressures and temperature levels; specific ambient pressure will determine the boil off components of the oil. If the leak site is not deep, and thus the pressure exerted on the leaked gas is not high, it is possible to collect the gas by means of a pipe line to the surface. However, when the ambient pressure is high or critical gas release could be prolific. As the oil and gas enter the balloon-like structure, fluid substances within the structure are separated by density and solids are filtered out by the filters 19, 20, 21. Oil is held and gas is vented either to the water or to a pipe or other gas collecting means 31. As the balloon fills up, buoyancy increases and the exhaust valve 27 is activated by tensed pendulum lines 40 attached to weights 16 and sealed off following gas release. After gas release, the structure returns to neutral buoyancy. Final oil loading to full is signalled by float 35 to stop gas venting; this increases buoyancy above neutrality and, as a result, hoists pendulum weight elements in reverse order to that of arrival.

When the multi-weight pendulum unit 16 starts to rise, the vent valve 27 is securely locked; this is used as a signal to inform the surface operators that the structure is reaching its maximum capacity and should be moved away from the source, either to the surface or parked over the seabed. A built-in overlap or skirt ensures the collected oil does not leak back into the water during ascent or a changeover operation. Once the vessel is ready to surface an additional gas vent may be briefly opened by the override controls 32; buoyancy becomes positive and the vessel rises. As the vessel ascends, ambient pressure decreases and the internal gas volume expands; as a result, the internal oil level and the float 35 go down, in turn, the exhaust vent 27 is activated. As the gas is vented through the exhaust valve 27, the oil level and float 35 will rise, consequently, the exhaust valve 27 will close and the ascent will continue. Once the vessel reaches the surface, the surface float controlling valve 53, becomes operational and resets valve 30 to the open position so that the vessel is stabilised during unloading. Oil decanting or removal requires additional gas input by valve 53 for maintenance of buoyancy.

On the seabed the full vessel is at neutral buoyancy and is anchored by weights 16a, 16b and 16c which are lifted during manoeuvres. In order to lift the weights, gas is added to the full envelope; as a result, the oil/gas surface goes down possibly below float 35, which float 35 may briefly open its valve 27 to vent to gas venting means 31 as weights 38 lock valve 27. Latch connection train 50 from vertical float arm 33 impedes this transient prospect but does not impede override by a water mass in the ladle 41 during ascent, i.e. when gas expands and oil/water level go down; thus, allowing valve 27 to open and vent surplus gas. On the seabed an empty vessel is controlled by added gas controls 32 and 48 (the vent valve).

The envelope of the balloon structure is typically made of fabric but could be made of metals, concrete, resins, foams or flexible plastics materials. Further, the control means 2 can be provided with a line for allowing gas from an independent gas reservoir to inflate the float in the event that gas from the leak is not sufficient to control buoyancy of the balloon structure 1. Further, the valve 3 comprises means for controlling outflow and inflow (independent, leak-related or a combination thereof) of gas within the control means 2 so that, ascent and descent of the balloon structure to and from the surface and loading can be controlled.

In operation more than one balloon structure can be included in a purposely modified submersible liquefied natural gas (LNG) tanker. The submersible vessel is adapted to incorporate a plurality of said devices, the vessel being adapted to submerge and be positioned over said oil source and manoeuvrable to enable the plurality of devices to be successively positioned over said source and filled with oil, the vessel being adapted to return to the surface to enable the oil to be removed.

Moreover, oil can be extracted while the balloon is over the source, i.e. for example the structure may be connected to a vessel permanently or semi-permanently by way of an additional line or two additional lines, one for oil and one for gas. Alternatively, the balloon can be used until it reaches its capacity and then replaced and moved to the surface in a controlled manner. Once emptied, the balloon structure 1 can be re-submerged for repeated additional use in a controlled manner. In addition, the main weight used to drag the vessel down could be separate from the multi-weight pendulum.

Further, the balloon structure may be provided with concentric rings or a framework to strengthen the envelope. The envelope may be collapsible, foldable or compressible to enable easy transportation. Although described as spherical, the balloon may be elongate in the manner of an air ship or may be cigar-shaped having the opening in one of its ends.

In addition, the weights can be fixed or adjustable to allow different loads to be loaded. Moreover, the device describe herein can be adapted to allow heavy lifting of objects other than oil from the seabed to the surface by replacing adjustable weights of appropriate mass with the object of interest. The device can also be adapted to allow low yield well oil retrieval tank. Further, the device can be used as an underwater atmosphere for divers and as a weather insulator for leisure or other purposes on the surface. Additionally, the device can be used as a submarine tool.

The invention claimed is:

1. A collection device for collecting and recovering oil and gas from an underwater source, said collection device comprising:
    a balloon structure defined by an envelope having an opening, which, in operation, is on an underside of said balloon structure, said balloon structure is configured to be placed over an underwater source to collect oil and gasses from said underwater source;
    a vent adapted to vent the gas from said envelope;
    control means for controlling an oil upper level, said control means having a closure valve configured to control a flow of the gas from said envelope through said vent, said valve being closable by a valve closure member, said valve closure member is configured to determine a minimum volume of the gas retained in said envelope and operable by floating means configured to float on oil; and
    buoyancy means in conjunction with said control means controlling the gas volume is configured to control a buoyancy of said balloon structure to enable descent of said collection device to said underwater source and ascent to a surface of a body of water in a controlled manner.

2. The collection device according to claim 1, wherein said buoyancy control means is configured to allow inflow of the gas to increase said buoyancy of said balloon structure.

3. The collection device according to claim 1 further comprising guide lines configured to secure said balloon structure to one of rails, anchors, and weights.

4. The collection device according to claim 3, wherein said lines are configured to secure said balloon structure to weights, said weights are one of adjustable and exchangeable.

5. The collection device according to claim 1, wherein said opening comprises at least one rigid ring configured to keep said opening open and prevent said opening from collapsing.

6. The collection device according to claim 5, wherein said control means for controlling the gas volume is configured to receive the gas from one of said underwater source, an independent reservoir, and a combination thereof.

7. The collection device according to claim 6, wherein said ring further comprises a tube configured to be filled with compressed gas so as to maintain said ring in a substantially rigid configuration.

8. The collection device according to claim 1, wherein said envelope is formed of a flexible material configured to enable said envelope to be one of collapsed and folded for one of storage and transportation.

9. The collection device according to claim 1, wherein said balloon structure further comprises means for determining whether a predetermined volume of oil has been reached by monitoring said volume of oil within said balloon structure.

10. The collection device according to claim 1, wherein said balloon structure further comprises means for sensing proximity of a seabed or said surface of said body of water.

11. The collection device according to claim 1, wherein said balloon structure further comprises one or more placement control units configured to expel the gas to allow one of resurfacing of said balloon structure, and placement of said balloon structure in a controlled manner.

12. The collection device according to claim 1, wherein said balloon structure further comprises one or more filters or screens to filter out debris.

13. The collection device according to claim 1 further comprising including a pipeline connected to said envelope to remove oil therefrom.

14. The collection device according to claim 1 further comprising oil sensor means to determine when an envelope full condition for the oil is reached.

15. The collection device according to claim 1, wherein said valve is located at an upper end of a hollow guide post featuring a first frame, and wherein a second frame comprises a plurality of spaced rollers engageable with said first frame receivable in said second frame, said second frame includes said floating means.

16. The collection device according to claim 15, wherein said envelope has a channel substantially centered on an envelope apex, wherein a top portion of said channel comprises said vent and said valve.

17. The collection device according to claim 15, wherein said valve is enclosed in said first frame, and said first frame comprises at least one substantially horizontal member configured to interact with said floating means which raise together with the volume of oil within said balloon structure, so that when the oil within said balloon structure has reached a predetermined level, said valve is closed by said floating means.

18. The collection device according to claim 15, wherein said control means further comprising an exhaust valve and a loading valve, said exhaust and loading valves are located within said guide post, said loading valve is configured to be opened when said buoyancy means is on the surface of water.

19. The collection device according to claim 1, wherein said control means further comprises a multi-weight pendulum weight assembly including a first weight configured to contact a seabed prior to additional weights of said multi-weight pendulum weight assembly, and thus configured to decrease a rate of descent of said balloon structure, and further wherein a float maintains at least one pendulum line connected to said multi-weight pendulum weight assembly tensed while above the seabed and preserves an operative connection to said control means, said pendulum line is connected to at least one pendulum line weight.

20. A method for collecting oil and gas from an underwater source, said method comprising the steps of:

a) providing a balloon structure defined by an envelope having a bottom opening;

b) placing and securing said balloon structure over an underwater source so that said opening is substantially over said underwater source;

c) allowing oil and gas from said underwater source to enter said balloon structure;

d) allowing the oil and gas to be separated by density gradient;

e) controlling buoyancy of said balloon structure by venting any excess gas;

f) allowing floating means to rise up in conjunction with oil level so that, when oil reaches a predetermined level, said floating means close a valve to control gas volume; and g) extracting the oil within said balloon structure by one of connecting at least one line from said balloon structure to a vessel, and allowing said balloon structure to resurface in a controlled manner.

* * * * *